(12) United States Patent
Tal et al.

(10) Patent No.: US 8,938,563 B2
(45) Date of Patent: Jan. 20, 2015

(54) MODIFIED I/OS AMONG STORAGE SYSTEM LAYERS

(71) Applicant: Kaminario Technologies Ltd., Yokne'am ILIT (IL)

(72) Inventors: Doron Tal, Haifa (IL); Eyal Gordon, Haifa (IL)

(73) Assignee: Kaminario Technologies Ltd., Yokne'am Ilit (IL)

( * ) Notice: Subject to any disclaimer, the term of this patent is extended or adjusted under 35 U.S.C. 154(b) by 0 days.

(21) Appl. No.: 13/726,872

(22) Filed: Dec. 26, 2012

(65) Prior Publication Data

US 2013/0191565 A1    Jul. 25, 2013

Related U.S. Application Data

(60) Provisional application No. 61/580,455, filed on Dec. 27, 2011.

(51) Int. Cl.
*G06F 3/00* (2006.01)
*G06F 13/12* (2006.01)
*G06F 3/06* (2006.01)

(52) U.S. Cl.
CPC .............. *G06F 3/0659* (2013.01); *G06F 3/061* (2013.01); *G06F 3/0683* (2013.01)
USPC ................................... 710/74; 710/5; 710/62

(58) Field of Classification Search
None
See application file for complete search history.

(56) References Cited

U.S. PATENT DOCUMENTS 7,117,337 B2 * 10/2006 Chiang et al. ................. 711/206
8,380,923 B2 * 2/2013 Wolrich et al. ............... 711/113

* cited by examiner

*Primary Examiner* — Idriss N Alrobaye
*Assistant Examiner* — David Martinez
(74) *Attorney, Agent, or Firm* — Wiggin and Dana LLP; Gregory S. Rosenblatt

(57) ABSTRACT

A method of managing I/Os in a storage system between a first storage layer and a second layer which is a logical abstraction over the first storage layer, comprising of maintaining within the first storage layer of the storage system validity status data indicating a validity status of each one of a plurality of first layer storage segments, in response to a write command that includes payload data which relates to part of an invalid segment providing the second layer with an unaligned write to an invalid segment indication, and in response to receiving the indication at the second layer, providing a modified write command for the invalid segment including initial values combined with the payload data.

24 Claims, 7 Drawing Sheets

US 8,938,563 B2

MODIFIED I/OS AMONG STORAGE SYSTEM LAYERS

FIELD OF THE INVENTION

The present invention is in the field of I/O management in a multi-layer storage system.

SUMMARY OF THE INVENTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

According to an aspect of the presently disclosed subject matter, there is provided a method of managing I/Os in a storage system between a first storage layer and a second layer, where the second storage layer is a logical abstraction over the first storage layer. According to examples of the presently disclosed subject matter, the method of managing I/Os can include: maintaining within the first storage layer of the storage system validity status data indicating a validity status of each one of a plurality of first layer storage segments; in response to a write command that includes payload data which relates to part of an invalid segment providing the second layer with an unaligned write to an invalid segment indication; and in response to receiving the indication at the second layer, providing a modified write command for the invalid segment including initial values combined with the payload data.

According to examples of the presently disclosed subject matter, each one of the plurality of first layer storage segments is associated with a plurality of first layer addressable storage blocks.

According to further examples of the presently disclosed subject matter, providing a modified write command comprises, combining initial values with the payload data, so that the modified write command relates to the entire respective invalid segment.

According to still further examples of the presently disclosed subject matter, the write command includes payload data for only some of the plurality of addressable storage blocks with which the respective invalid segment is associated.

In yet further examples of the presently disclosed subject matter, the modified write command includes the payload data and initial values for remaining blocks within the respective invalid segment.

According to examples of the presently disclosed subject matter, a size of each one of the plurality of first layer storage segments corresponds to a minimal TRIM granularity supported by the storage system.

According to yet further examples of the presently disclosed subject matter, the method further includes writing the data from the modified write command to the entire invalid segment and updating the validity status of the segment to indicate that the segment is now a valid segment.

According to still further examples of the presently disclosed subject matter, the method further includes: in response to a read command that relates to some or all blocks with which an invalid segment is associated, providing the second layer with an indication that the blocks with which the invalid segment is associated are invalid; and in response to receiving the invalid block indication, generating at the second layer a modified read response using initial values for representing initial data for each one of the blocks with which the invalid segment is associated and to which the read command relates.

According to examples of the presently disclosed subject matter, in case the read command further relates to one or more blocks of a valid segment, the generating comprises reading the data from the blocks of the valid segment and concatenating the data from the valid blocks with the initial values representing data from the invalid segment.

According to examples of the presently disclosed subject matter, the validity status data that is maintained in the first layer indicates a validity status of each one of a plurality of first layer addressable blocks, and wherein the updating the validity status of the segment includes updating the validity status of each one of the blocks with which the segment is associated.

According to examples of the presently disclosed subject matter, the method further includes: in response to a read command that relates to an invalid block, providing the second layer with an indication that the block is invalid; and in response to receiving the invalid block indication, generating at the second layer a modified read response using initial values for representing invalid data for the invalid block.

According to further examples of the presently disclosed subject matter, in response to a write command that includes payload data which relates to an entire invalid segment, writing the payload data to the entire invalid storage segment and updating the validity status data to indicate that the storage segment is now a valid storage segment.

According to examples of the presently disclosed subject matter, the data from the modified write command and the updating the status of the storage segment to indicate that the storage segment block is now a valid storage segment are performed in a single atomic transaction.

According to further examples of the presently disclosed subject matter, providing a modified write command further includes providing an indication in association with the write command not to write the initial values in case the indication for the respective block was modified to a valid block indication.

A further aspect of the presently disclosed subject matter relates to a system for managing I/Os between a first storage layer and a second layer which is a logical abstraction over the first storage layer A system for managing I/Os between a first storage layer and a second layer which is a logical abstraction over the first storage layer. According to examples of the presently disclosed subject matter, the system for managing I/Os can include a validity status table, an enhanced interface unit and a modified I/O generation module. The validity status table is kept in the first storage layer of the storage system and can include validity status data indicating a validity status of each one of a plurality of first layer storage segments. The enhanced interface unit is implemented in the first storage layer, and can be responsive to metadata in a write command indicating that the write command includes payload data which relates to part of an invalid segment for providing the second layer with an unaligned write to an invalid segment indication. The modified I/O generation module is implemented in the first storage layer, and can be responsive to receiving the unaligned write to an invalid segment indication at the second layer, for providing a modified write command for the invalid segment including initial values combined with the payload data.

According to examples of the presently disclosed subject matter, each one of the plurality of first layer storage segments can be associated with a plurality of first layer addressable storage blocks.

According to yet further examples of the presently disclosed subject matter, the modified I/O generation module can be adapted to combine initial values with the payload data, so that the modified write command relates to the entire respective invalid segment.

According to still further examples of the presently disclosed subject matter, the modified I/O generation module can be adapted to combine initial values with the payload data, so that the modified write command includes payload data for only some of the plurality of addressable storage blocks with which the respective invalid segment is associated.

In yet further examples of the presently disclosed subject matter, the modified I/O generation module can be adapted to combine initial values with the payload data, so that the modified write command includes the payload data and initial values for remaining blocks within the respective invalid segment.

According to examples of the presently disclosed subject matter, a size of each one of the plurality of first layer storage segments can correspond to a minimal TRIM granularity supported by the storage system.

According to examples of the presently disclosed subject matter, the system can further include a first storage layer controller that is responsive to receiving the modified write command for writing the data from the modified write command to the entire invalid segment and for updating the validity status of the segment in the validity status table to indicate that the segment is now a valid segment.

According to examples of the presently disclosed subject matter, the enhanced interface unit is responsive to receiving a read command that relates to some or all blocks with which an invalid segment is associated for providing an indication that the blocks with which the invalid segment is associated are invalid, and wherein the modified I/O generation module is responsive to receiving the invalid block indication for generating a modified read response using initial values for representing initial data for each one of the blocks with which the invalid segment is associated and to which the read command relates.

According to further examples of the presently disclosed subject matter, in case the read command further relates to one or more blocks of a valid segment, the modified I/O generation module can be configured to read the data from the blocks of the valid segment and concatenate the data from the valid blocks with the initial values representing data from the invalid segment.

In yet further examples of the presently disclosed subject matter, the validity status data in the validity status table can indicate a validity status of each one of a plurality of first layer addressable blocks, and the first storage layer controller can be adapted to update the validity status of each one of the blocks with which the segment to which the modified write command relates is associated.

According to examples of the presently disclosed subject matter, the enhanced interface unit is responsive to a read command that relates to an invalid block for providing the second layer with an indication that the block is invalid, and the modified I/O generation module is responsive to receiving the invalid block indication for generating a modified read response using initial values for representing invalid data for the invalid block.

According to examples of the presently disclosed subject matter, the first storage layer controller is responsive to a write command that includes payload data which relates to an entire invalid segment for writing the payload data to the entire invalid storage segment for updating the validity status data in the validity status table to indicate that the storage segment is now a valid storage segment.

In further examples of the presently disclosed subject matter, the first storage layer controller can be configured to write the data from the modified write command and to update the validity status of the segment in a single atomic transaction.

In still further examples of the presently disclosed subject matter, the modified I/O generation module can be adapted to provide an indication in association with the modified write command not to write the initial values in the modified write command in case the indication for a respective block was modified to a valid block indication.

In a further aspect of the presently disclosed subject matter, there is provided a program storage device readable by machine, tangibly embodying a program of instructions executable by the machine to perform a method of managing I/Os in a storage system between a first storage layer and a second layer which is a logical abstraction over the first storage layer. According to examples of the presently disclosed subject matter, the program storage device can tangibly embody a program of instructions executable by the machine to perform a method of managing I/Os in a storage system between a first storage layer and a second layer which is a logical abstraction over the first storage layer, including: maintaining within the first storage layer of the storage system validity status data indicating a validity status of each one of a plurality of first layer storage segments; in response to a write command that includes payload data which relates to part of an invalid segment providing the second layer with an unaligned write to an invalid segment indication; and in response to receiving the indication at the second layer, providing a modified write command for the invalid segment including initial values combined with the payload data.

In a further aspect of the presently disclosed subject matter, there is provided a computer program product comprising a computer useable medium having computer readable program code embodied therein of managing I/Os in a storage system between a first storage layer and a second layer which is a logical abstraction over the first storage layer. According to examples of the presently disclosed subject matter, the computer program product can include: computer readable program code for causing the computer to maintain within the first storage layer of the storage system validity status data indicating a validity status of each one of a plurality of first layer storage segments; computer readable program code for causing the computer to in response to a write command that includes payload data which relates to part of an invalid segment providing the second layer with an unaligned write to an invalid segment indication; computer readable program code for causing the computer to in response to receiving the indication at the second layer, providing a modified write command for the invalid segment including initial values combined with the payload data.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
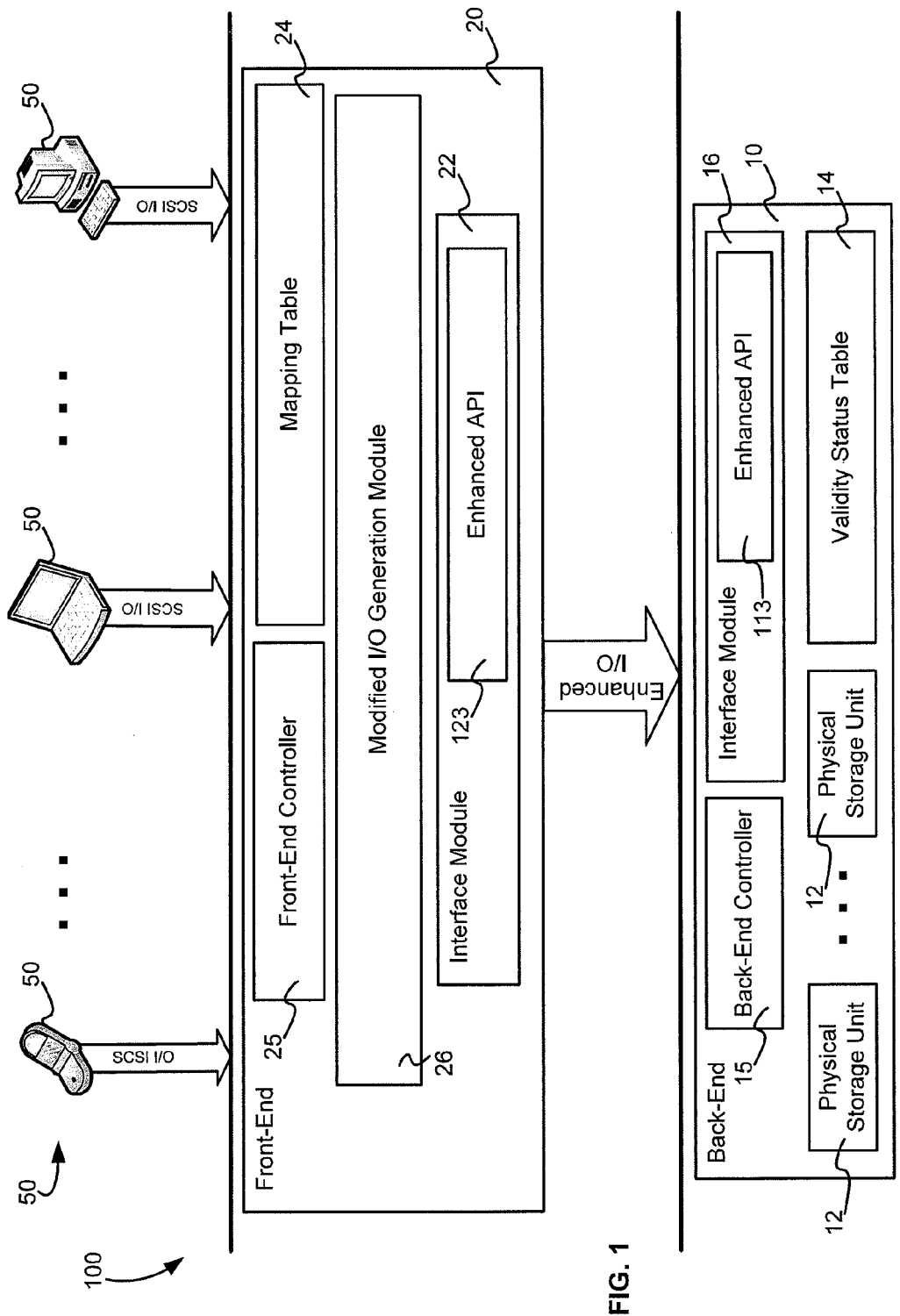
FIG. 1 is a schematic block diagram of a storage system for enabling enhanced I/Os among a first storage layer and a second layer which is a logical abstraction over the first storage layer, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

The present invention relates to a storage system that is configured to enable and a method that is operative for enabling modified I/Os among two layers of the storage system. According to examples of the presently disclosed subject matter, a first layer of the storage system can be a storage layer that is used for physically storing data on physical storage media that is implemented as part of the first layer, and a second layer of the storage system can be a logical abstraction over the first (storage) layer, and the storage system can be configured to support modified I/Os between the first storage layer and the second logical layer.

It would be appreciated, that according to examples of the presently disclosed subject matter, the first layer can be a logical layer as well, and would only appear to be a physical storage layer from the perspective of the second layer. In this configuration, the first and the second layer can be implemented according to examples of the presently disclosed subject matter and can support the exchange of the modified I/Os described below.

Throughout the description and the claims, reference is made to the term "layer" in the context of a storage system, e.g., the terms "storage layer", "first storage layer", "second layer", "logical layer", "physical storage layer", etc. are used. The term layer is known in the art of storage systems, and the following definition is provided as a non-limiting example only for convenience purposes. Accordingly, the interpretation of the term "layer" in the claims, unless stated otherwise, is not limited to the definitions below and the term "layer" should be given its broadest reasonable interpretation. The term layer or layering as used herein relates to the organization of storage resources (physical and logical) into separate functional components that can interact in some hierarchical way, possibly through appropriate interfaces or controllers, with each layer usually having an interface only to the layer above it and the layer below it.

According to examples of the presently disclosed subject matter, in a storage system that includes a first layer and a second layer which is a logical abstraction over the first storage layer, validity status data indicating a validity status of each one of a plurality of first layer storage segments can be maintained within the first storage layer. The validity status data can be used to determine whether a write command (also referred to herein as the "original write command") includes payload data which relates to part of an invalid segment. According to examples of the presently disclosed subject matter, the write command is communicated from the second layer to the first layer. Further according to examples of the presently disclosed subject matter, in case the write command does indeed include payload data which relates to part of an invalid segment, an indication can be provided to the second layer that the write command is unaligned to an invalid segment. Still further according to examples of the presently disclosed subject matter, in response to receiving at the second layer the indication of an unaligned write to an invalid segment indication (which is related to the original write command), a modified write command can be provided for the invalid segment. Yet further according to examples of the presently disclosed subject matter, the modified write command can include initial values combined with the payload data from the original write command.

Reference is now made to FIG. 1, which is a schematic block diagram of a storage system for enabling enhanced I/Os among a first storage layer and a second layer which is a logical abstraction over the first storage layer, according to examples of the presently disclosed subject matter. In the example shown in FIG. 1, and described below, a front end unit ("FE unit") 20 represents the second layer of the storage system 100, and a backend unit ("BE unit") 10 represents the first storage layer. It would be appreciated that this representation is an example of one possible implementation of the two layers and is non-limiting. Furthermore, the front end can include a plurality of discrete units, such as FE unit 20 for example, that collectively constitute the front end of the storage system 100. Further by way of example, the plurality of FE units can be controlled by a central control unit, or can implement a distributed control unit in a manner which is known per-se. Similarly, the back end of the storage system 100 can be comprised of a plurality of BE units, and the plurality of BE units can be virtualized. Throughout the description and in the claims, the terms FE unit, second storage layer and logical layer are interchangeable. The terms BE unit, first storage layer and storage layer are also used interchangeably.

According to examples of the presently disclosed subject matter, the BE unit 10 can include a physical storage unit 12 or any array of physical storage units 12 that are controlled by a storage array controller (not shown). The physical storage unit 12 is where the data of the storage system is retained. Various physical storage media are known and can be used according to examples of the presently disclosed subject matter, including: Solid State Storage devices, such as Flash disks, and DRAM storage units and non-solid state storage device, such as Hard Drive Disks, optical disks, etc. The physical storage unit 12 can be formatted and its storage resources can be referenced by an addressing scheme. As an example, the physical storage unit 12 can be a block storage device, such as Solid State Drive, addressable in units of blocks (or physical storage blocks). For the sake of illustration each physical storage block can be 512 bytes in size.

According to examples of the presently disclosed subject matter, the BE unit 10 can be configured to expose its physical storage resources, e.g. as physical storage blocks, to the FE unit 20. The FE unit 20 can be configured to provide a logical abstraction over the (physical) storage resources of the BE unit 10, and can map logical addresses over the physical storage blocks.

For example, the FE unit 20 can provision the hosts with a range of logical addresses which the hosts can ask to read from or write to. The FE unit 20 can be configured to use the storage resources provided by the BE unit 10 for the actual physical storing of the data and can read the data that is stored on the storage resources provided by the BE unit 10. According to examples of the presently disclosed subject matter, the addresses provisioned by the FE unit 20 can be different from the physical storage blocks exposed by the BE unit 10, and the FE unit 20 can include a mapping table 22 in which logical addresses are mapped to physical storage blocks. For example, in the mapping table 22 each one of a plurality of logical addresses that are provisioned to the hosts 50 can be mapped to one or more storage blocks of the physical storage unit 12.

By way of example, the FE unit 20 can support a SCSI Logical Unit addressing scheme, and can allocate to the hosts 50 logical units. Each logical unit can be assigned with a logical unit number (LUN), and each logical unit can have a plurality of logical block addresses (LBAs). Each LBA of each LUN of the FE unit 20 can be mapped to one or more physical storage blocks of the BE unit 10 (at least the ones that are provisioned to the hosts 50). I/Os exchanged between the FE unit 20 and the hosts 50 can reference the LUN and LBA to which they relate. According to the SCSI address provided with the I/O from the host 50, the FE unit 20 can determine from the mapping table 22 to which physical storage blocks the I/O relates and can communicate with the BE unit 10 in order to write or retrieve data from the respective physical storage blocks. It would be appreciated that it is possible according to examples of the presently disclosed subject matter, that the total addressable size (in bytes) of the FE unit 20 is different from the total addressable size of the BE unit 10.

According to examples of the presently disclosed subject matter, the BE unit 10 can be configured to maintain validity status data indicating a validity status of each one of a plurality of storage segments. According to examples of the presently disclosed subject matter, each one of the plurality of storage segments can be associated with two or more physical storage blocks. For example, referring to the example given above, each physical storage block can be 512 bytes in size, and each storage segment can be 4 KB (8 blocks). Thus, according to examples of the presently disclosed subject matter, the granularity of the validity status data in the table 14 is lower than the granularity of write and/or read commands in the storage system 100. In other words, the validity status data is provided with respect to storage segments which are (each) equivalent to two or more physical storage blocks, where a (single) storage block represents the minimum addressable storage resource in the storage system 100 for write and/or read commands (and possibly the minimum addressable storage resource for other I/O commands).

Before moving forward with the description of further features according to examples of the presently disclosed subject matter, there is now provided a description of a storage system according to one example of the presently disclosed subject matter, wherein the granularity of the validity data is set according to a TRIM command granularity. In this example, the storage system supports and implements a TRIM interface command (or API command) by which a logical layer (e.g., the FE unit 20) can notify the storage layer (e.g., the BE unit 10) that certain physical storage addresses are not (or are no longer) in use by the logical layer. It should be noted, that in further examples, validity data can be a result of other processes or can be set by a direct instruction and can also be manually provided by an operator. Therefore, any reference made here to a TRIM command can be replaced with any type of invalidation instruction and any reference to TRIMed data is an example of invalid data.

Thus for example, in a storage system that supports and implements the TRIM command, when a "Logical Unit" is deleted in the logical layer, the "old" data in the corresponding TRIMed block range (in the storage layer) is invalid.

Now, for the sake of illustration, assuming that the granularity of the validity data is set according to a TRIM command granularity, and further assuming a minimal TRIM command segment size of 4 KB, and assuming that the storage system supports a minimal I/O size of one physical storage block, and further assuming that each block is 512 bytes in size, then the validity status indications which are supported by the storage system 100 (and which are stored in the BE unit 10) relate to 4 KB storage segments (each consisting of 8×512 byte storage blocks), whereas the I/Os from the hosts 50 are not bound by this constraint and can have a different (e.g., finer) granularity. For example, the minimum write or read command granularity that is supported by the storage system can correspond to a single physical block. In other examples, the minimum I/O granularity that is supported by the storage system can correspond to a predefined number (two or more) of physical storage blocks, so long as this minimum I/O granularity is different (e.g., finer) than the granularity of the validity status indications (a segment).

Thus, it would be appreciated, that in a storage system such as the one that is proposed according to examples of the presently disclosed subject matter, wherein the validity status data is stored in the storage layer (e.g., the BE unit 10), write commands that are addressed to the physical storage layer can relate to only part of an invalid segment.

Figure 2:
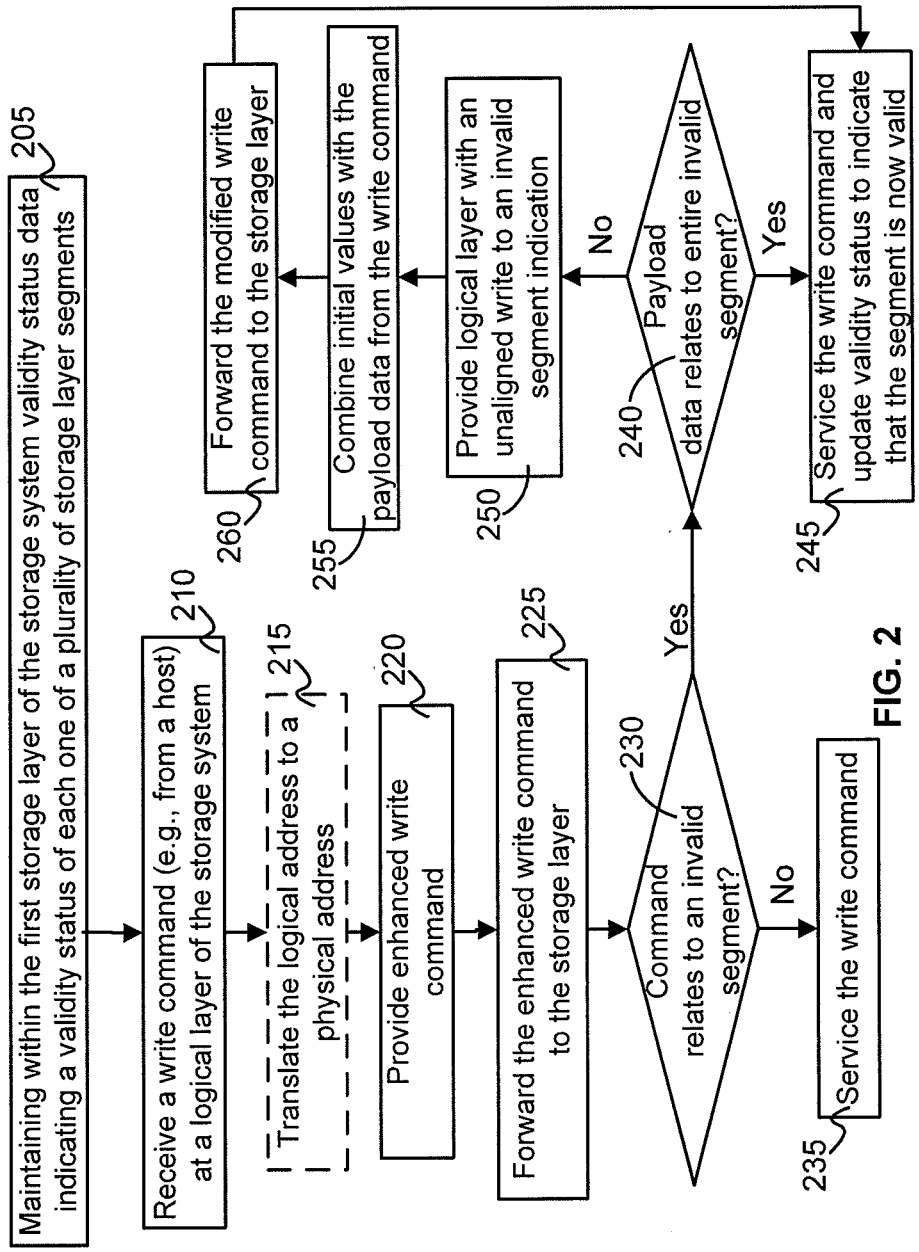
FIG. 2 is a flowchart illustration of a method of enabling modified I/Os in a storage system among a first storage layer and a second layer which is a logical abstraction over the first storage layer, according to examples of the presently disclosed subject matter.

Reference is now additionally made to FIG. 2 which is a flowchart illustration of a method of enabling modified I/Os in a storage system among a first storage layer and a second layer which is a logical abstraction over the first storage layer, according to examples of the presently disclosed subject matter. The first block (block 205) of the method shown in FIG. 2 refers to the maintaining of the validity status data within the first storage layer of the storage system, as was already mentioned above. As was also mentioned, the validity status data indicates a validity status of each one of a plurality of storage layer segments.

At some point, a write command from a host 50 can be received at the storage system 100. The write command can go to the FE unit 20 (block 210), which as stated above can be a representative of a logical layer in a storage system. The front end unit 20 can have an interface 22 through which the write command from the host 50 can be received. According to examples of the presently disclosed subject matter, the write command from the host 50 can reference a logical address(es), such as SCSI LBA(s) in a non-limiting example, where the host 50 is requesting the storage system 100 to retain the data.

Upon receiving the write command from the host 50, the FE unit 20 can be configured to translate the logical address provided with or in association with the write command from the host 50 to a corresponding physical storage address (block 215), which tells the FE unit 20 which are the physical storage block(s) that are mapped to the logical address(es) designated by the host 50. By obtaining the physical storage block(s) that are mapped to the logical address(es) designated by the host 50, the FE unit 20 can tell the BE unit 10 where the data in the write command should be written. According to examples of the presently disclosed subject matter, the FE unit 20 can include a mapping table 22 which records for each logical address, the physical storage blocks (also referred to herein as physical storage locations) which are associated with that logical address. As mentioned above, for each logical address one, two or more physical storage blocks can be assigned, depending on the configuration of the storage system 100.

According to examples of the presently disclosed subject matter, the FE unit 20 can be further adapted to generate an enhanced write command based on the write command from the host 50 (block 220). According to some examples of the presently disclosed subject matter, the FE unit 20 can include an enhanced interface unit 123 that is configured to allow the FE unit 20 to generate, based on the write command from the host 50, an enhanced write command. It should be understood that the term "enhanced write command" as used herein relates to an I/O command, typically non-standard, which is based on a corresponding standard write command. The enhanced write command can be generated by adapting the standard I/O command, according to examples of the presently disclosed subject matter. As will be described herein, an enhanced write command according to examples of the presently disclosed subject matter can enable a certain operation or operations within a storage system, for example, a non-standard I/O operation. Further below, reference is made to other types of enhanced I/O command which are similarly non-standard I/O commands that are based on respective standard I/O command, and which enable a non-standard I/O operation.

For example, the write command from the host 50 can be a standard SCSI I/O, and the enhanced interface unit 123 can be utilized to provide an enhanced write command (and possibly also other enhanced I/O commands). Details with respect to the enhanced write command, and with respect to other enhanced I/O commands, are provided below.

According to examples of the presently disclosed subject matter, the FE unit 20 can forward the enhanced write command to the BE unit 10 (block 225). As mentioned above, the BE unit 10 that is shown in FIG. 1 and which is referred to herein can serve as an example of a storage layer that is comprised of a plurality of BE units, and the FE unit 20 (which can also be part of a logical layer that is comprised of a plurality of FE units) can determine, for example based on the physical storage blocks associated with the write command, to which one of the BE units to assign the enhanced write command.

According to examples of the presently disclosed subject matter, the BE unit 10 can also include an enhanced interface unit 113 which is operable for enabling a certain operation within the storage system 100 with respect to enhanced write commands and possibly in respect of further enhanced I/O commands, as described herein. Thus, the enhanced interface unit 123 of the FE unit 20 can operate in cooperation with the enhanced interface unit 113 of the BE unit 10 to enable a certain operation. According to examples of the presently disclosed subject matter, the enhanced interface units 113 and 123 can implement an enhanced API to enable the generation, exchange and processing of the enhanced I/O commands described herein. According to examples of the presently disclosed subject matter, the operation that is enabled by the enhanced write command (and possibly by further enhanced I/O commands) is a non-standard I/O operation.

According to examples of the presently disclosed subject matter, the operation enabled by the enhanced interface units 123 and 113 utilizes the validity status data that is stored in the BE unit 10. According to examples of the presently disclosed subject matter, the BE unit 10 can include a validity status indication table 14 that can be used for recording validity status data. As mentioned above, the validity status indication table 14 can be configured to maintain a validity status of each one of a plurality of storage segments. Also as mentioned above, according to examples of the presently disclosed subject matter, the validity status data can be provided with respect to storage segments which are (each) equivalent to two or more physical storage blocks, where a (single) storage block represents the minimum addressable storage resource in the storage system 100 for write commands (and possibly the minimum addressable storage resource for other I/O commands, including read commands).

According to examples of the presently disclosed subject matter, as part of providing or generating an enhanced write command, the FE unit 20 (e.g., using the enhanced interface unit 123) can be configured to add to the original (e.g., standard) write command (or to associate with the original write command) metadata, giving rise to an enhanced write command.

According to examples of the presently disclosed subject matter, the enhanced interface 113 can be configured to identify the metadata that was added by the enhanced interface unit 123 of the FE unit 20 and can initiate certain logic in the BE unit 10 that is applicable to enhanced write commands. For example, the metadata can indicate to the BE unit 10 that it needs to determine whether the write command relates to a non-valid segment. Further by way of example, the metadata can indicate to the BE unit 10 that in case it is determined that the enhanced write command relates to part of a segment which is indicated to be invalid, the write command should not be served, and the data that is included in the enhanced write command should not be written, for example into the physical storage unit 12. According to further examples of the presently disclosed subject matter, the metadata in the enhanced write command can indicate to the BE unit 10 that in case the write command relates to part of a segment which is indicated to be invalid, the BE unit 10 should notify the FE unit 20 that the write command is unaligned to an invalid segment.

According to examples of the presently disclosed subject matter, the BE unit 10 can include a BE controller 15 which is adapted to control and implement various operations in the BE unit 10. The BE controller 15 can be implemented in software, hardware or a combination thereof, and can be configured to process incoming enhanced write commands according to examples of the presently disclosed subject matter, possibly in cooperation with the enhanced interface 113. In particular, according to examples of the presently disclosed subject matter, the enhanced interface unit 113 can include logic that is necessary for enabling the processing of the metadata in the enhanced write commands for determining whether the enhanced write command relates to part of a segment which is indicated to be invalid. According to further examples of the presently disclosed subject matter, the enhanced interface unit 113 can include logic that is necessary for enabling the BE unit 10 to notify the FE unit 20 that the write command is unaligned to an invalid segment.

According to still further examples of the presently disclosed subject matter, the metadata that is added by the FE unit 20 to the enhanced write command can also indicate to the BE unit 10 that in case the write command relates to an entire segment which is indicated to be invalid, the BE unit 10 should service the write request and update the validity status of the corresponding segment, to indicate that this is now a "valid" segment. According to yet further examples of the presently disclosed subject matter, the metadata that is added by the FE unit 20 to the enhanced write command can also indicate to the BE unit 10 that in case the write command relates to a segment (an entire segment or part of a segment) which is indicated to be valid, the BE unit 10 should follow the standard protocol. Typically, in such cases the write command is serviced by the BE unit 10 and the response includes an acknowledgment that indicates that the data was written according to the request.

It would be understood, that in a storage system, where validity data is provided at a per-segment granularity and each segment is equivalent to two or more physical storage blocks (a block denotes a minimum addressable storage resource), writing to only part of an invalid segment can be undesirable. For example, writing to only part of an invalid segment can corrupt the validity status data, because the validity status indication with respect to the corresponding segment can become non-credible. For example, assuming that the write command is serviced and the indication with respect to the segment is kept unchanged (i.e. the validity status remains "invalid") to reflect that part of the data (the part which the write command did not affect) is invalid, than, for example, a background process which "wipes" the data in the invalid segments (e.g., writes "0"'s) based on the validity status data can erroneously perceive the entire segment as invalid and would "wipe" the data that was written in response to the write command, together with the invalid data. Further by way of example, if a reverse approach is implemented and the write command which relates to part of a segment that is indicated to be invalid is serviced and the indication with respect to the segment is changed to "valid" to reflect that part of the data (the part which the write command affect) is valid, than, for example, a subsequent read command which relates to at least part of the segment which was not affect by the write command would be serviced (because the indication with respect to the segment is that the segment is valid) and could result in invalid data being returned.

According to examples of the presently disclosed subject matter, the enhanced write command can be received at the BE unit 10, and the BE unit 10 can recognize, for example, according to metadata included in the command, that the write command is an enhanced write command. For example, the enhanced interface 113 of the BE unit 10 can be configured to identify certain metadata that is attached to an enhanced write command, and which indicates that the write command is an enhanced write command. It would be appreciated, that in further examples of the examples of the presently disclosed subject matter, the indications from the FE unit 20 to the BE unit 10 which are provided by the metadata can be provided in other manners and in various other forms, and that the examples of the FE unit 20 and of the BE unit 10 which are described herein can be modified to support such other forms of indication.

According to still further examples of the presently disclosed subject matter, the FE unit 20 and the BE unit 10 are configured to relate to each write command as an enhanced write command. A similar configuration can be applied to each read command and possibly also to other I/O commands. In such cases, the marking and the classification of the enhanced I/O are not necessary. [IS THIS A POSSIBILITY?]

Continuing now with the description of the examples of the presently disclosed subject matter shown in FIG. 2, once the BE unit 10 receives a write command (or an enhanced write command that is identified as such) it can be configured to determine whether the write command relates to a segment that is indicated to be "invalid" according to the validity status data (block 230). According to examples of the presently disclosed subject matter, the BE unit 10 can be configured to lock the validity status indication table 14 until a response to the write command is issued by the BE unit (blocks 235, 245 or 250 below) to guarantee an atomic transaction, as will be further explained below.

In case the write command relates to a segment that is indicated to be valid, the BE unit 10 can be configured to service the write command according to the standard protocol (block 235). In case the write command relates to a valid segment the lock on the table 14 can be released immediately. Typically, when the write command relates to a segment that is indicated to be valid, the payload data in the write command can be written to the storage blocks referenced in the write command and an acknowledgment can be returned in a response message from the BE unit 10 to the FE unit 20 and from the FE unit 20 to the host 50, to indicate that the data was successfully stored in the storage system 100. The actual operations which take place in the BE unit 10 to the FE unit 20, and the timing of the operations can depend on the configuration of the storage system 100.

In case the write command relates to a segment that is indicated to be invalid, the BE unit 10 can be configured to check whether the write command is aligned to an invalid segment(s), or not (block 240). For example, with reference to the example provided above, wherein the minimum addressable storage resource for write commands is a 512 bytes block and the validity status indications are provided for 4 KB storage segments, then the write command is aligned to a given invalid segment when the write command relates to the entire 8 blocks of the "invalid" segment. According to examples of the presently disclosed subject matter, in case the write command is indeed aligned to an invalid segment, in a single atomic transaction, the BE unit 10 can be configured to service the enhanced write command by writing the data to the storage blocks underlying the invalid segment, and update to validity status of the respective segment to "valid" (block 245). Once the payload data is written to the desired location in the storage unit 12 and the data in the validity status table 14 is updated, the lock on the validity status table 14 can be released.

It would be appreciated that in some storage systems, the BE unit can be configured to acknowledge the servicing of the write command before the data is actually written to the storage blocks referenced in the write command. For the purpose of the current disclosure, the operations carried out by the storage system to enable the acknowledgment of the servicing of the write command are considered to be equivalent to the actual writing of the data to the desired location in the storage unit, and any reference made herein to the writing of the payload data to the storage unit in the storage layer is meant to cover such other operations allow the storage layer to acknowledge the servicing of a write command.

According to examples of the presently disclosed subject matter, in case at block 230 it is determined that the write command relates to an invalid segment and at block 240 it is determined that the write command is not aligned to the invalid segment, the BE unit 10 can be configured to issue a response to the write command indicating (to the FE unit 20) that the enhanced write is a unaligned to an invalid segment (block 250), and once the indication is issued, the BE unit 10 can release the lock on the validity status table 14. It would be appreciated that at this stage of processing the write command the payload data is not written to the physical storage blocks referenced in the write command.

According to examples of the presently disclosed subject matter, the response indicating that the write command is unaligned to an invalid segment can indicate which blocks underlie the segment. According to still further examples of the presently disclosed subject matter, in case part of the write command is either associated with a valid segment or relates to an entire segment, the BE unit 10 can service those parts and acknowledge the writing thereof, and the unaligned write to an invalid segment indication can be limited to the part of the write command which is associated with part of (and not an entire) invalid segment.

According to examples of the presently disclosed subject matter, the FE unit 20 can be responsive to an indication of an unaligned write to an invalid segment for generating a modified write command that is based on the original write command from the host 50. In examples of the presently disclosed subject matter, the FE unit 20 can include a modified I/O generation module 26 which can receive an indication from the enhanced interface 123 that a modified write needs to be generated, along with the details of the segment with which the write is associated and the relevant payload data from the original (or enhanced) write command, in case this data (or part of it) is not already available to the modified I/O generation module 26. According to examples of the presently disclosed subject matter, the modified I/O generation module 26 can be configured to combine invalid values with the payload data from the write command to generate a modified write command (block 255).

According to examples of the presently disclosed subject matter, the modified I/O generation module 26 can be configured to combine initial values with the payload data, so that the modified write command relates to the entire respective invalid segment. Thus, for example, given that the original write command included payload data for only some of the plurality of addressable storage blocks with which the respective invalid segment is associated, the modified write command includes initial values for the remaining blocks within the respective invalid segment. Referring back to the 512 bytes block size and 4 KB segments example provided above, assuming the original write command included payload data for 4 out of the 8 blocks of an invalid segment, the modified I/O generation module 26 can combine the 4 blocks of payload data with 4 blocks of initial values (e.g., "0"'s) to provide a modified write command that is aligned to the invalid segment. According to some examples, the modified I/O generation module 26 can be further adapted to indicate (e.g. in metadata) which blocks contain payload data and which are added as padding to the modified write command. As will be further described below, at least with reference to FIG. 5, the BE unit 10 can be configured to use this indication in certain circumstances.

The FE unit 20 can be configured to forward the modified write to the BE unit 10 (block 260), and the BE unit 10 can service the modified write request in the same manner as it would service a write command that is aligned to an invalid segment (block 245). In some examples of the presently disclosed subject matter, the FE unit 20 can provide the modified write command as an enhanced write command, for example, the enhanced interface 123 can add the metadata mentioned above to the modified write command, in which case the enhanced interface of the BE unit 113 would identify the added metadata and in response would initiate the processing blocks that are implemented by the BE unit 10 for enhanced write commands. In particular, blocks 230 and 240 can be implemented in respect of the modified (enhanced) write command, and because the modified write command relates to a segment that is indicated to be invalid, and the write command relates to the entire segment, block 245 would be selected and executed.

In further examples of the presently disclosed subject matter, the FE unit 20 can be configured to provide the modified write command as a standard write command and blocks 230 and 240 are not repeated for the modified write command, and instead a standard I/O protocol can be implemented by the BE unit 10 in respect of the modified write command. For example, an interface module 16 of the BE unit 10 can receive the modified write command, and the payload data in the modified write command (which corresponds to an entire segment) can be written to the storage blocks referenced in the modified write command. The writing of the payload data to the physical storage unit(s) 12 can be implemented as a single atomic transaction with the modification of a validity status of the respective segment in the validity status table 14, to indicate that the segment is now a valid segment.

Figure 3:
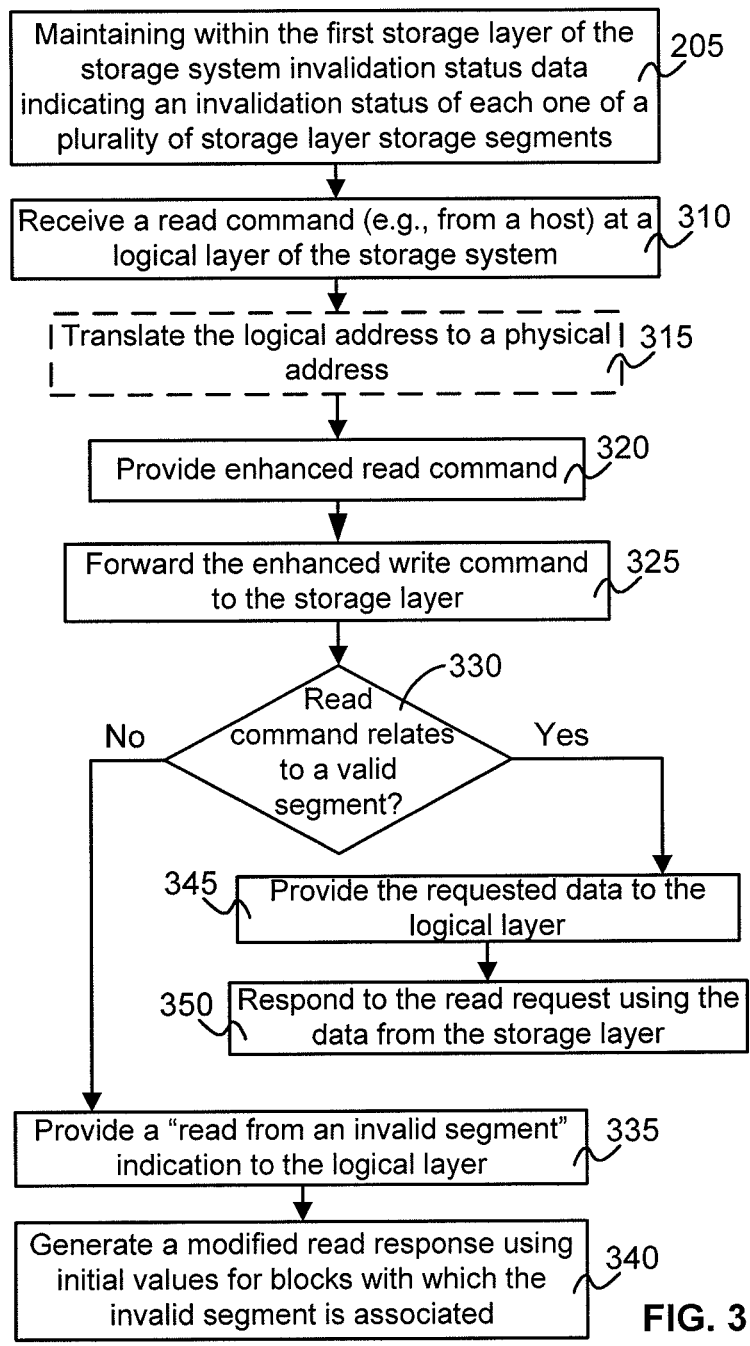
FIG. 3 is a flowchart illustration of further features of the method of enabling modified I/Os in a storage system among a first storage layer and a second layer which is a logical abstraction over the first storage layer, according to examples of the presently disclosed subject matter.

Reference is now made to FIG. 3 which is a flowchart illustration of further features of the method of enabling modified I/Os in a storage system among a first storage layer and a second layer which is a logical abstraction over the first storage layer, according to examples of the presently disclosed subject matter. In FIG. 3 the handling of a read command from a host is described. FIG. 3 begins with block 205 which was already described above with reference to FIG. 2. At block 310 a read command is received at the storage system 100, for example from a host 50. The read command is received at the FE unit 20, and typically the FE unit 20 translates the address(es) reference in the read command from the host to the physical storage locations in the BE unit 10, as was explained above (block 315).

According to examples of the presently disclosed subject matter, the FE unit 20 can utilize its enhanced interface 123 to provide an enhanced read command that is based on the original read command for the host 50 (block 320). It should be understood that the term "enhanced read command" as used herein relates to an I/O command, typically non-standard, which is based on a corresponding standard read command. The enhanced read command can be generated by adapting the standard I/O command, according to examples of the presently disclosed subject matter. As will be described herein, an enhanced read command according to examples of the presently disclosed subject matter can enable a certain operation or operations within a storage system, for example, a non-standard I/O operation. For example, the read command from the host 50 can be a standard SCSI I/O, and the enhanced interface unit 123 can be utilized to provide an enhanced read command.

According to examples of the presently disclosed subject matter, the FE unit 20 can forward the enhanced read command to the BE unit 10 (block 225). As mentioned above, the BE unit 10 that is shown in FIG. 1 and which is referred to herein can serve as an example of a storage layer that is comprised of a plurality of BE units, and the FE unit 20 (which can also be part of a logical layer that is comprised of a plurality of FE units) can determine, for example based on the physical storage blocks referenced in the read command, to which one of the BE units to assign the enhanced read command.

According to examples of the presently disclosed subject matter, the enhanced interface unit 113 of the BE unit 10 can be configured for enabling a certain operation within the storage system 100 with respect to enhanced read commands (and possibly in respect of other enhanced I/O commands). Thus, the enhanced interface unit 123 of the FE unit 20 can operate in cooperation with the enhanced interface unit 113 of the BE unit 10 to enable a certain operation. According to examples of the presently disclosed subject matter, the operation that is enabled by the enhanced read command (and possibly by further enhanced I/O commands) is a non-standard I/O operation.

According to examples of the presently disclosed subject matter, the operation enabled by the enhanced interface units 123 and 113 utilizes the validity status data that is stored in the BE unit 10 (for example in the validity status indication table 14).

According to examples of the presently disclosed subject matter, as part of providing or generating an enhanced read command, the FE unit 20 (e.g., using the enhanced interface unit 123) can be configured to add to the original (e.g., standard) read command (or to associate with the original read command) metadata, giving rise to an enhanced read command. Upon received a read command, the BE unit 10, for example using the enhanced interface 113, can check whether the read command is an enhanced read command (block 330). For example, the enhanced interface 113 can be configured to identify the metadata that was added by the enhanced interface unit 123 of the FE unit 20 and can initiate certain logic in the BE unit 10 that is applicable to enhanced read commands.

The metadata can indicate to the BE unit 10 that the FE unit 20 is requesting receive an indication in case the read command relates to blocks which are associated with an invalid segment. According to further examples of the presently disclosed subject matter, the metadata of an enhanced read command can indicate to the BE unit 10 that the FE unit 20 is requesting to receive an indication in case the read command relates to blocks which are associated with an invalid segment, and that the FE unit 20 is further requesting to receive in a response to the read command (the response from the BE unit 10 to the FE unit 20) initial values for the storage locations referenced in the enhanced read command which are associated with an invalid segment.

As mentioned above, in one example of the presently disclosed subject matter, the BE unit 10 can be configured to provide a modified read response that includes initial values (e.g., "0"'s) for each storage location that is associated with an invalid segment. According to examples of the presently disclosed subject matter, the controller 15 can be configured to add the initial values to the modified response according to the validity status of a segment (or segments) with which certain blocks that are referenced in a respective enhanced read command are associated. It would be appreciated that in case the enhanced read command is only associated with invalid segment(s) (and is not associated with any valid segments) the response from the BE unit 10 can consist of initial values only (no non-initial values). According to some examples the FE unit 20 and the BE unit 10, can each be configured to provide (e.g in the metadata) a predefined indication in respect to invalid values and each of the FE unit 20 or the BE unit 10, can be configured to identify the predefined indication in respect to the invalid values such that values in an I/O which are associated with the predefined indication are regarded as invalid.

FIG. 3 illustrates a different implementation according to further examples of the presently disclosed subject matter, wherein in case an enhanced read command is received at the BE unit 10, the BE unit 10 is configured to respond to the enhanced read command with an indication that the read command relates to blocks which are associated with an invalid segment (block 335). The indication specifies to the FE unit 20 which blocks are associated with an invalid segment. The FE unit 20, possibly utilizing a FE controller 25, can be responsive to the indication from the BE unit 10 for adding initial values to the read response for each one of the blocks that were referenced by the (original and enhanced) read command and were indicated as being associated with an invalid segment (block 340). The initial values which are associated with an invalid segment can be used to provide a modified read response, as explained below.

According to examples of the presently disclosed subject matter, for blocks referenced in the read command that are associated with valid segments, the BE unit 10 can retrieve the data that is stored in the blocks and provide the retrieved data to the FE unit 20 (block 345), and the FE unit 20 can respond to the read command using the data provided by the BE unit 10 (block 350). As mentioned above, in case the (original) read command relates both to blocks that are associated with valid segment and to blocks that are associated with invalid segments, the FE unit 20, e.g., utilizing the modified I/O generation module 26, possibly in cooperation with the FE controller 25, can be configured to combine initial values for the blocks that are associated with the invalid segments with the data provided by the BE unit 10 for the blocks that are associated with the valid segments, and provide the combined data in a modified read response.

It would be appreciated that according to examples of the presently disclosed subject matter, the BE unit 10 may not be required to provide atomicity for enhanced read commands. Thus for example, the BE unit 10 can consult the validity status table 14 and read data from the physical storage unit 12 without needing to run these two operations in a single atomic transaction.

So far the examples that were provided all referred to the TRIM command. However, it would be appreciated that other processes and configuration in a storage system can render certain parts of the physical storage resources invalid, and the indications with regard to the validity of the physical storage resources can have a granularity which is different, and in particular coarser than the minimum write command granularity that is supported by the storage system (and possibly also coarser than the minimum granularity that is supported by the storage system for other I/O commands).

There is now provided a description of a method of enabling modified I/Os in a storage system among a first storage layer and a second layer which is a logical abstraction over the first storage layer, where validity data that is associated with a snapshot process is provided in the first layer, according to examples of the presently disclosed subject matter. This description serves as an example of a further process which can render certain parts of the physical storage resources invalid, and which is characterized by indications regarding the validity of the physical storage resources that have a granularity which is coarser than the minimum write and read command granularity that is supported by the storage system. It would be appreciated that the nature of the initial values and the operations that are involved in obtaining or providing the initial values in this example differ in some respects from the operations that were involved in the examples above.

According to examples of the presently disclosed subject matter, in the storage system 100 shown in FIG. 1, a snapshot of a logical unit can be performed at the logical layer. For illustration purposes, the version of the logical unit at the time of the snapshot is referred to herein as "A" and the resulting snapshot is referred to herein as "B". The FE unit 20 can allocate, by updating its mapping data, certain address range(s) within the BE unit 10, which are dedicated to store the different versions of the data—the contents of A and of B. Following the allocation of the address range(s) in the BE unit 10 for the snapshot B, a background task which writes the data from A to B can be initiated. This process can take some time to complete, and in the meantime B can contain data which is invalid.

Furthermore, as mentioned above, according to examples of the presently disclosed subject matter, the task which writes the data from A to B can be implemented as a background process, and therefore, when B is allocated, the data in the underlying address range(s) is invalid and remains so until the background process actually writes the data from A into B and the indications stored in the BE unit 10 regarding the validity of the physical storage resources are updated, or until in response to a new write commands, new data is written to B. However, in case the granularity of the indications in the validity status table is coarser than the minimum write and read command granularity that is supported by the storage system, servicing write command which involve writing to only part of an invalid segment can corrupt the validity status data.

Thus, according to examples of the presently disclosed subject matter, the proposed method and system for enabling modified I/Os in a storage system among a first storage layer and a second layer which is a logical abstraction over the first storage layer, where validity status data that is provided in the first layer, can be implemented for enabling modified writes to an invalid snapshot segment. In examples of the presently disclosed subject matter, in case the BE unit 10 responds to a write command with an unaligned write to an invalid segment, the modified write command can combine the payload data from the original write command with data from the respective segment(s) in the snapshot source.

In further examples of the presently disclosed subject matter, when the original write command includes payload data for only some of the plurality of addressable storage blocks with which an invalid segment(s) is associated, the initial values for the remaining block(s) of the segment(s) can be obtained from the snapshot source. In the description of examples of the presently disclosed subject matter, and in the claims, the meaning of the term "initial values" includes (but is not limited to) values from a snapshot source.

According to examples of the presently disclosed subject matter, the reading of the necessary initial values from the snapshot source and the combination of the payload data from the original write command with the data brought from the snapshot source (initial values) can be carried out by the FE unit 20. For example, an unaligned write to an invalid segment can cause the modified I/O generation module 26, possibly in cooperation with the controller 25, to read the necessary block(s) from the snapshot source (e.g., certain blocks of the BE unit 10), and once the block(s) from the snapshot source are obtained the modified I/O generation module 26 can combine them with the payload data from the original write command, placing the data in an appropriate order. As mentioned above, according to some examples, the modified I/O generation module 26 can be further adapted to indicate (e.g. in metadata) which blocks contain payload data and which are added as padding to the modified write command. As will be further described below, at least with reference to FIG. 5, the BE unit 10 can be configured to use this indication in certain circumstances.

Furthermore, according to examples of the presently disclosed subject matter, the proposed method and system for enabling modified I/Os in a storage system among a first storage layer and a second layer which is a logical abstraction over the first storage layer, where validity status data that is provided in the first layer, can be implemented for enabling a modified read command to an invalid snapshot segment. In examples of the presently disclosed subject matter, in case the BE unit 10 responds to a read command with a read from an invalid segment response, the modified read response can include initial values from the snapshot source for blocks which are referenced in the read command and which are associated with the invalid segment(s). In case the read command also referred to block(s) which are associated with a valid segment(s), the data from the block(s) associated with the valid segment(s) are read from the snapshot (the destination) and are combined in the modified read response with the data from the snapshot source (for block(s) which are referenced in the read command and which are associated with the invalid segment(s)).

According to examples of the presently disclosed subject matter, the reading of the necessary data from the snapshot source and (if necessary) the combination (if necessary) of the data from the snapshot source with data from the snapshot (destination) can be carried out by the FE unit 20. For example, a read from an invalid segment indication that is received by the FE unit 20 (from the BE unit 10) can cause the modified I/O generation module 26, possibly in cooperation with the controller 25, to read the necessary block(s) from the snapshot source (e.g., certain blocks of the BE unit 10), and once the block(s) from the snapshot source are obtained (and if necessary) the modified I/O generation module 26 can combine them with the data from the block(s) associated with the valid segment(s), placing the data in an appropriate order.

According to examples of the presently disclosed subject matter, a further enhanced I/O command which can be supported by the FE unit 20 and by the BE unit 10 can be the validity status indication query. For example, the FE unit's enhanced interface 123 can be configured to provide in the command parameters of the validity status indication query an address range, and the BE unit's enhanced interface 113 can identify that this is a non-standard I/O and can cause the BE unit 10 to respond to the query with information indicating which subsets (in segments or in blocks) of the address range are invalid and which are valid.

According to further examples of the presently disclosed subject matter, the storage layer (e.g., the BE unit 10) can be configured to provide an interface which the logical layer (e.g., the FE unit 20) may use to query whether the storage layer supports the enhanced read and write commands, as well as the query validity status indications, as described above.

There is now provided a description of several examples which provide a non-limiting illustration of certain scenarios and the operation of the system for enabling enhanced I/Os among a first storage layer and a second layer which is a logical abstraction over the first storage layer under the given scenarios, according to examples of the presently disclosed subject matter.

Figures 4A, 4B:
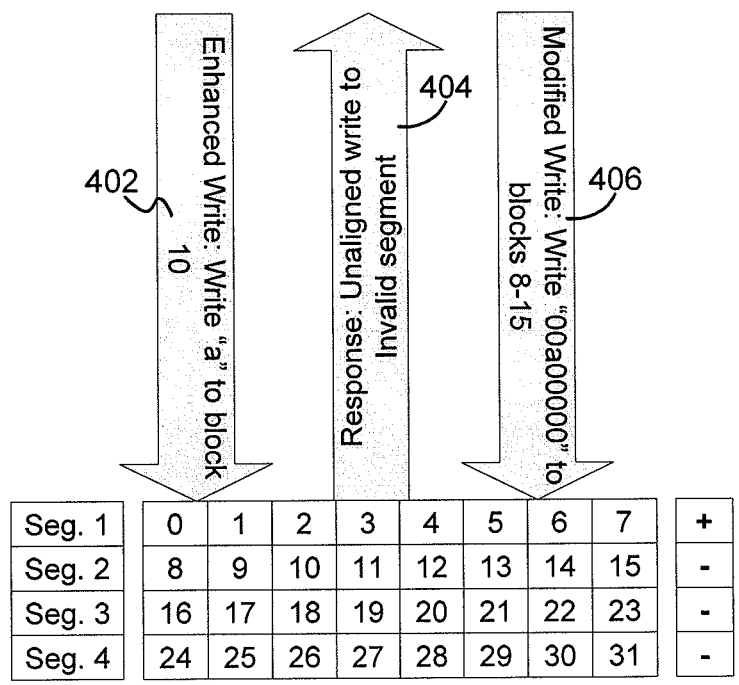
FIG. 4A is a simplified graphical illustration of the state of the validity table in the storage layer when an incoming write command that is not aligned to the granularity of the data in the validity status table is received at the storage layer, according to examples of the presently disclosed subject matter.
FIG. 4B is a simplified graphical illustration of the state of the validity table in the storage layer following the processing of a modified write command by the storage layer, according to examples of the presently disclosed subject matter

The first scenario relates to the processing of an incoming write command that is not aligned to the granularity of the data in the validity status data in the storage layer. The description of this first scenario is accompanied by FIGS. 4A and 4B. FIG. 4A is a simplified graphical illustration of the state of the validity table in the storage layer when an incoming write command that is not aligned to the granularity of the data in the validity status table is received at the storage layer, according to examples of the presently disclosed subject matter. The number appearing in the table in FIG. 4A represent the blocks numbers with which each one of the four segments in the validity table is associated. FIG. 4B is a simplified graphical illustration of the state of the validity table in the storage layer following the processing of a modified write command by the storage layer, according to examples of the presently disclosed subject matter. The symbols in FIG. 4B represent the data that is stored in each of the corresponding blocks. The sign "+" indicates valid data (this is the data in the blocks of segment 1). The sign "−" indicates invalid data (this is the data in the blocks of segments 3 and 4). In the blocks of segment 2, "a" indicates the payload data from the original write command, and "0"s indicate the initial values that were added by the logical layer to the modified write command.

By way of example, the scenario illustrated in FIGS. 4A and 4B can be the result of a TRIM command. Assume that segments 1-4 are each 4 KB segments, each consisting of 8 blocks (each being 512 bytes). Assume also that a logical unit (e.g., a SCSI LU) that was associated with segments 1-4 was deleted. As a result, the logical layer frees a block address range that spans blocks 0-31, on which the data of the deleted logical unit resided, and calls the storage layer to TRIM this address range. The storage layer marks all 4 KB subsets from address 0-31 as TRIMed (or invalid). Now assume that the logical layer (possibly according to an instruction from a user) creates a SCSI logical unit 'A' of size 16 KB. Assume that as a result, the logical layer allocates block addresses 0-31 for the new logical unit A, and a background task is which writes "0"s to addresses 0-31 is kicked off, one 4 KB segment at a time.

According to examples of the presently disclosed subject matter, the background task can be configured to use enhanced writes, specifying that the 4 KB write command should not be written in case the underlying 4 KB segment in the storage layer is not "TRIMed" (or for which the indication is no longer "TRIMed").

Continuing with the description of the example scenario in FIGS. 4A-4B, sometime after the background task was initiated, say after the background task completes updating segment 1 ("0" are written to blocks 0-7 and the validity status for segment 1 is modified to indicate that it is not "TRIMed"), an external write command is issued to the logical layer. The logical layer can translate the logical address(es) referenced in the original write command from the user to corresponding block address(es). According to examples of the presently disclosed subject matter, the logical layer can use the enhanced semantics enabled by its enhanced API and issue an enhanced write command to the logical layer with the payload data from the original write command and referencing the appropriate block address(es). For example, the enhanced write command 402 can be to write the value "a" to block 10 and return and "unaligned write to an invalid segment" in case the write is to an invalid (in this case "TRIMed") segment and is not aligned to the invalid segment.

It would be appreciated that the values used herein and in the accompanying drawings are provided for illustration purposes only, and do not represent "real" or even typical values in a storage system, in particular one in which a segment corresponds to 4 KB of data and a block can store 512 bytes.

The storage layer receives the enhanced write and processes it. The storage layer determines that block 10 is part of segment 2, which is "TRIMed" according to the indication in the validity status table. Since, the enhanced write involved only one of the eight blocks with which the "invalid" segment 2 is associated, the storage layer response to the enhanced write command with an "unaligned write to an invalid segment" response 404.

The logical layer, which received the "unaligned write to an invalid segment" response 404 generates a modified write command 406 by adding initial values, in this case "0"s, to the payload data from the original (or from the enhanced) write command, and send the modified write command 406 to the storage layer. The storage layer received the modified write command 406 and identifies that this it is aligned to an invalid (or in this case to a "TRIMed") segment. Therefore, according to its enhanced API, the storage layer writes the payload data from the original write command with the initial values added by the logical layer and updates the status of the respective segment (segment 2) in the validity status table, to indicate that segment 2 is now a valid segment (or that segment 2 is no longer a "TRIMed" segment). The processing of the modified write command is performed as a single atomic transaction, and the locks which are necessary to guarantee atomicity can be applied on the relevant data sources.

Figure 5:
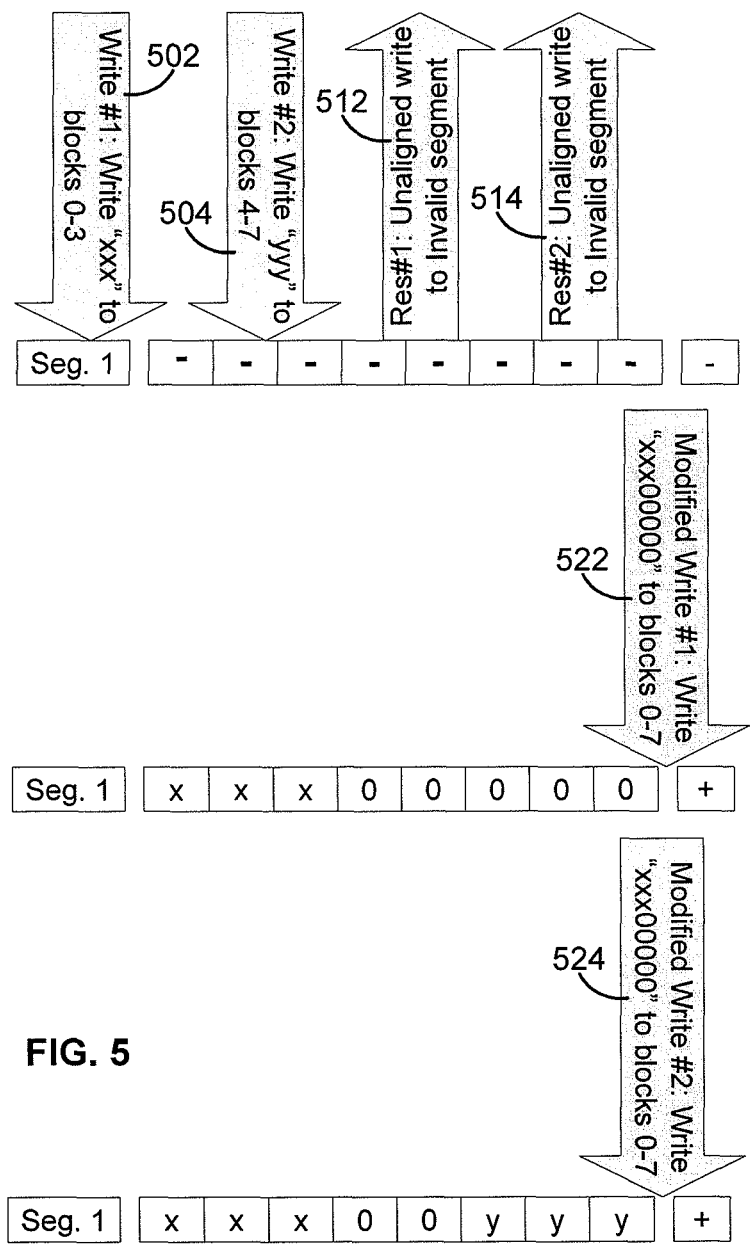
FIG. 5 is a simplified graphical illustration of the processing of two enhanced write commands, both relating to part of the same segment, and are both received at the storage layer while the validity status indication for the segment is set to the "invalid" state, and the processing of the corresponding modified write commands, in accordance with examples of the presently disclosed subject matter.

Another scenario is now described with reference to FIG. 5. FIG. 5 is a simplified graphical illustration of the processing of two enhanced write commands, both relating to part of the same segment, and are both received at the storage layer while the validity status indication for the segment is set to the "invalid" state, and the processing of the corresponding modified write commands, in accordance with examples of the presently disclosed subject matter. According to examples of the presently disclosed subject matter, as is shown by way of example in FIG. 5, at some point, a first enhanced write command 502 which relates to part of segment 1 can be received at the storage layer while the validity status indication for segment 1 is set to the "invalid" state. The storage layer identifies that the enhanced write command relates to part of an invalid segment, and since this is an enhanced write command, the storage layer responds with an "unaligned write to an invalid segment" response 512.

As will be described below, the logical layer can be configured to generate a modified write command 522 in correspondence with the "unaligned write to an invalid segment" response 512, and when the storage layer services the modified write command 522 the status of segment 1 can change to valid, but it is nonetheless possible that before the validity status of segment 1 is updated, a second write command that relates to part of the same segment, in this case segment 1, would be received at the logical layer, and the logical layer generates in response a second enhanced write command 504 which is received at the storage layer while the validity status of segment 1 is still "invalid". According to examples of the presently disclosed subject matter, in this case, the storage layer can return a second "unaligned write to an invalid segment" response 514. It would be appreciated that in case the second write 504 is aligned to segment 1, it would be processed without being rejected and the storage layer will mark segment 1 as valid, and thus when the modified write 522 corresponding to the first write command 502, the status of segment 1 is valid and therefore, the modified write command 522 is handled as a standard write and only the payload data, as indicated by the metadata, associated with it is written to segment 1.

In response to the second "unaligned write to an invalid segment" response 514, the logical layer can be configured to generate a second modified write command 524. As mentioned above, both the first modified write command 522 and the second modified write command 524 include payload data from the corresponding original write command combined with initial values to complete a write to an entire segment.

In the following description it is assumed that the logical layer receives and begins to process the first modified write command 522 in advance of the second modified write command 524, however this reflects a mere example, and due to various circumstances and system/component configurations the order can be in the reverse. At some point, the first modified write command 522 can be received by the storage layer, and some time later, the second modified write command 524 can also be received at the storage layer. Possibly the second modified write command 524 can be received at the storage layer during the processing of the first modified write command 522. However, since the storage layer is configured to lock the validity status indication for segment 1 until the entire transaction associated with the servicing of the first modified write command 522 is complete, the servicing of the second modified write command 524 can only take after the servicing (at the storage layer) of the first modified write command 522 is complete. It would be appreciated, that the storage layer can include a buffer and can use the buffer to store or memorize pending modified write commands, inter-alia, for cases such as this.

So, the storage layer process the first modified write command 522, writes the payload data combined with the initial values to the entire segments and updates the validity status for segment 1 in a single atomic transaction. As mentioned above, the storage layer can be configured to allow the processing of the second modified write command 524 only after the processing of the first modified write command 522 is completed. Accordingly, in accordance with examples of the presently disclosed subject matter, even if the second modified write command 524 is received which the storage layer is servicing the first modified write command 522, the processing of the second modified write command 524 begins only after the servicing of the first modified write command 522 is complete, and the validity status indication for segment 1 is set to "valid".

As mentioned above, according to examples of the presently disclosed subject matter, in the case of write commands, the storage layer is configured to apply the enhanced API only with respect to a write command which relate to an "invalid segment". Further according to examples of the presently disclosed subject matter, when the validity status indication for a segment to which a write command relates is set to valid, the storage layer is configured to implement the standard I/O configuration, and service the write command a standard write command. Thus according to examples of the presently disclosed subject matter, in case the servicing of a modified write request takes place when the validity status for the respective segment is already updated to "valid", the storage layer can be configured to ignore the initial values that were added to the modified write command and only write the payload data. According to examples of the presently disclosed subject matter, the logical layer can be configured to use data which is distinctive for the initial values, and the storage layer can be configured to identify the initial values in a modified write command, and ignore them when necessary. In other examples of the presently disclosed subject matter, the logical layer can specify, for example in the metadata of the modified write command, which values are initial values, and thus the storage layer can process the metadata of the modified write command and identify which are the initial values that were added to by the logical layer to the modified write command.

Referring back to FIG. 5, as part of processing the first modified write command 522, the storage layer writes the string "xxx00000" which includes initial values (the "0"s) to blocks 0-7. However, when the second modified write command 524 is processed at the storage layer, the validity status for segment 1 is set to "valid", and therefore, the storage layer is configured to ignore the initial values in the second modified write command 524 and only write the payload data, which is in this case "yyy" to blocks 5-7.

As mentioned above, according to examples of the presently disclosed subject matter, if the original write command relates to a block range which consists of block that belong to a valid segment and blocks which belong to an invalid segment, the servicing of the write command can be performed in parts, and for the blocks for which an "unaligned write to an invalid segment" response is received at the logical layer a modified write command can be issued. According to examples of the presently disclosed subject matter, the logical layer can be configured to acknowledge the write command, for example vis-à-vis a host in case it was issued by a host, after all the storage layer acknowledges all the write commands that are associated with the original write command.

Figure 6:
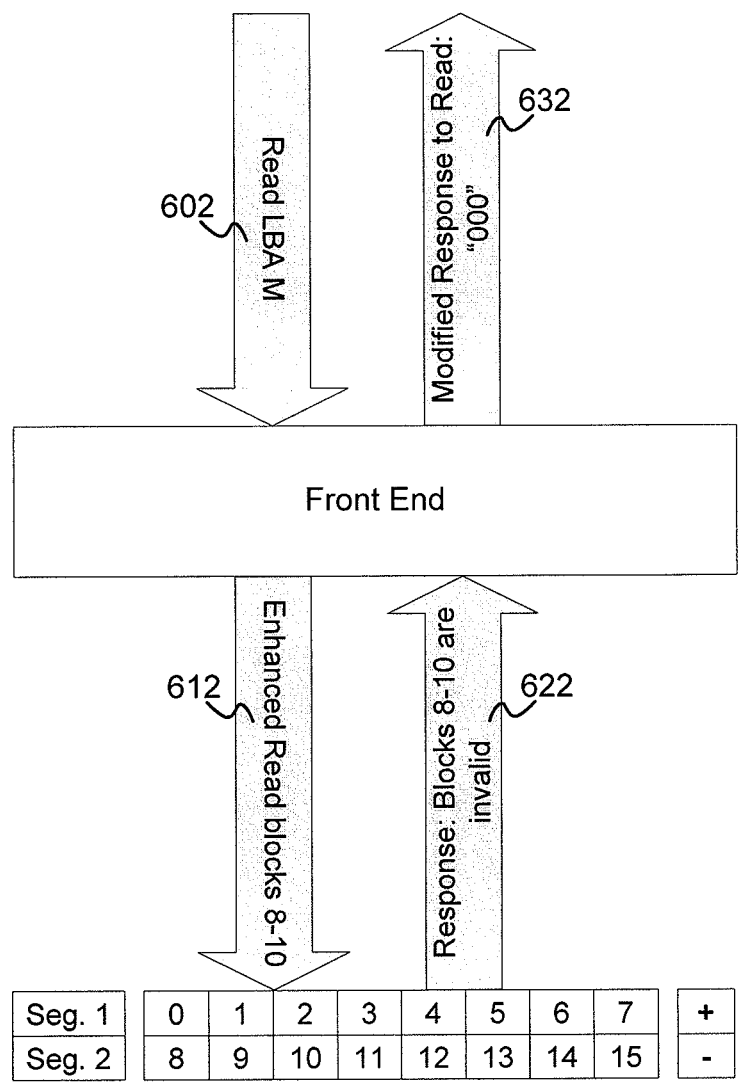
FIG. 6 is a simplified graphical illustration of the processing of a read command that relates to blocks of an invalid segment, in accordance with examples of the presently disclosed subject matter.

FIG. 6, to which reference is now made, is a simplified graphical illustration of the processing of a read command that relates to blocks of an invalid segment, in accordance with examples of the presently disclosed subject matter. As is shown in FIG. 6 and according to examples of the presently disclosed subject matter, at some point, a read command, 602 for example from a host, can be received at the logical layer. The read command 602 typically references a certain logical address (or addresses or range(s) of logical addresses), and the logical layer translates the logical address(es) to a corresponding block address, which are used by the storage layer to store and access data. According to examples of the presently disclosed subject matter, the logical layer can generate an enhanced read command 612 based on the original read command 602, as was described above.

By way of example, the enhanced read command 612 can reference the block addresses which correspond to the logical addresses referenced in the original read command 602, and can include or any other data which can cause the storage layer to provide an indication 622 to the logical layer in case the enhanced read command 612 relates to blocks which are associated with an invalid segment, and the storage layer can be configured to provide this indication 622 when the enhanced read command 612 relates to blocks which are associated with an invalid segment.

According to examples of the presently disclosed subject matter, in case in connection with a certain read command 602 the logical layer receives an indication from the storage layer that the read command 602 relates to blocks that are associated with an invalid segment, the logical layer can be configured to include in a modified response 632 to the read command 602 initial values for the blocks to which the read command 602 relates that are associated with an invalid segment. It would be appreciated that according to examples of the presently disclosed subject matter, in case the read command 602 relates also to blocks that are associated with valid segments, the logical layer can be configured to combined the values for the blocks associated with the valid segments that were read from the storage layer with the initial values that were included in the response for the blocks that are associated with the invalid segment (or segments).

According to some embodiments, in addition or as an alternative to the indication that the read command relates to blocks which are associated with an invalid segment, the storage layer can be configured to provide the logical layer with initial values for the blocks to which the enhanced read command 612 relates and which are associated with an invalid segment (or segments). Further by way of example, in case the enhanced read command 612 relates also to blocks that are associated with valid segments, the storage layer can be configured to combined the values for the blocks associated with the valid segments with initial values for the blocks that are associated with the invalid segment (or segments), and combine the values in the response 622 to the enhanced read command 612.

Figure 7:
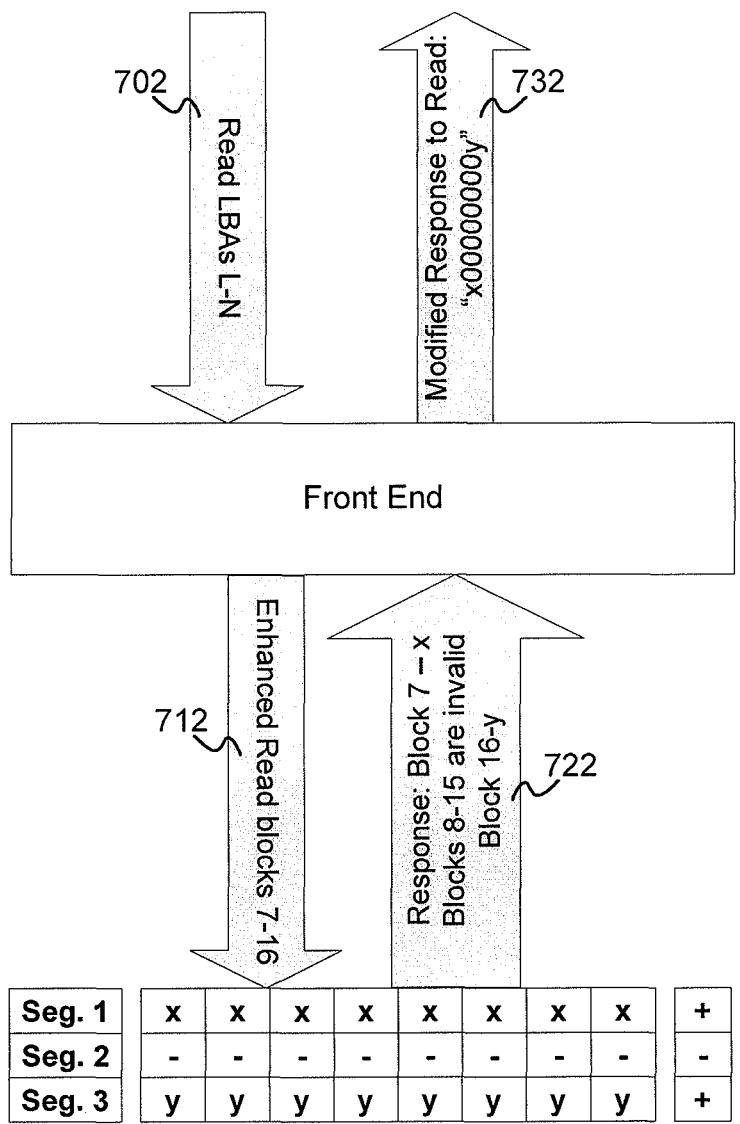
FIG. 7 is a simplified graphical illustration of the processing of a read command that relates to blocks of an invalid segment and also to block of a valid segment, in accordance with examples of the presently disclosed subject matter.

FIG. 7, to which reference is now made, is a simplified graphical illustration of the processing of a read command that relates to blocks of an invalid segment and also to block of a valid segment, in accordance with examples of the presently disclosed subject matter. As is shown in FIG. 7 the read command 702 references a logical addresses range which correspond to a certain range of storage blocks. According to examples of the presently disclosed subject matter, the logical layer can generate an enhanced read command 712 based on the original read command 702, as was described above.

According to examples of the presently disclosed subject matter, the storage layer is configured to implement the predefined processing routine that is defined for enhanced read commands upon identifying that the incoming I/O is an enhanced read command 712. According to examples of the presently disclosed subject matter, in accordance with the predefined processing routine for enhanced read commands, the storage layer determines whether the enhanced read command 712 relates to blocks that are associated with an invalid segment. In FIG. 7 the enhanced read command 712 relates to both blocks that are associated with an invalid segment, and to blocks that are associated with valid segments.

According to examples of the presently disclosed subject matter, the storage layer can be configured to include in the response 722 to the enhanced read command 712 the data from the blocks that are associated with the valid segments and initial values for the blocks that are associated with the invalid segment(s). In a further example, the storage layer can be configured to include in the response 722 to the enhanced read command 712 the data from the blocks that are associated with the valid segments and an indication for the blocks that are associated with the invalid segment(s) that these blocks are invalid. The later configuration is depicted in FIG. 7.

According to examples of the presently disclosed subject matter, the logical layer is configured to provide a modified response to the read command 732 that includes initial values for blocks to which the original read command 702 relates and which are associated with an invalid segment. As is shown in FIG. 7, the initial values in the modified response 732 for the blocks associated with an invalid segment can be combined with data that was read from the storage layer for blocks that are associated with valid blocks.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. method of managing I/Os in a storage system between a first storage layer and a second layer which is a logical abstraction over the first storage layer, comprising: maintaining within the first storage layer of the storage system validity status data indicating a validity status of each one of a plurality of first layer storage segments; in response to a write command that includes payload data which relates to part of an invalid segment providing the second layer with an unaligned write to an invalid segment indication; in response to receiving the indication at the second layer, providing a modified write command for the invalid segment including initial values combined with the payload data.

The invention claimed is:

1. A method of managing I/Os in a storage system between a first storage layer and a second layer which is a logical abstraction over the first storage layer, comprising:
   maintaining within the first storage layer of the storage system, validity status data indicating a validity status of each one of a plurality of first layer storage segments;
   in response to a write command that includes payload data which relates to part of an invalid segment providing the second layer with an unaligned write to an invalid segment indication; and
   in response to receiving the indication at the second layer, providing a modified write command for the invalid segment including initial values combined with the payload data; wherein each one of the plurality of first layer storage segments is associated with a plurality of first layer addressable storage blocks and wherein said providing a modified write command, comprises combining initial values with the payload data, so that the modified write command relates to the entire respective invalid segment; and writing the data from the modified write command to the entire invalid segment and updating the validity status of the segment to indicate that the segment is now a valid segment.

2. The method according to claim 1, wherein the modified write command includes payload data for only some of the plurality of addressable storage blocks with which the respective invalid segment is associated.

3. The method according to claim 2, wherein the modified write command includes the payload data and initial values for remaining blocks within the respective invalid segment.

4. The method according to claim 1, wherein a size of each one of the plurality of first layer storage segments corresponds to a minimal TRIM granularity supported by the storage system.

5. The method according to claim 1, further comprising:
in response to a read command that relates to some or all blocks with which an invalid segment is associated, providing the second layer with an indication that the blocks with which the invalid segment is associated are invalid; and
in response to receiving the invalid block indication, generating at the second layer a modified read response using initial values for representing initial data for each one of the blocks with which the invalid segment is associated and to which the read command relates.

6. The method according to claim 5, wherein in case the read command further relates to one or more blocks of a valid segment, said generating comprises reading the data from the blocks of the valid segment and concatenating the data from the valid blocks with the initial values representing data from the invalid segment.

7. The method according to claim 1, wherein the validity status data that is maintained in the first layer indicates a validity status of each one of a plurality of first layer addressable blocks, and wherein said updating the validity status of the segment includes updating the validity status of each one of the blocks with which the segment is associated.

8. The method according to claim 7, further comprising:
in response to a read command that relates to an invalid block, providing the second layer with an indication that the block is invalid; and
in response to receiving the invalid block indication, generating at the second layer a modified read response using initial values for representing invalid data for the invalid block.

9. The method according to claim 1, wherein in response to a write command that includes payload data which relates to an entire invalid segment, writing the payload data to the entire invalid storage segment and updating the validity status data to indicate that the storage segment is now a valid storage segment.

10. The method according to claim 1, wherein said writing the data from the modified write command and said updating the status of the storage segment to indicate that the storage segment block is now a valid storage segment are performed in a single atomic transaction.

11. The method according to claim 1, wherein said providing a modified write command further includes providing an indication in association with the modified write command not to write the initial values in the modified write command in case the indication for a respective block was modified to a valid block indication.

12. A system for managing I/Os between a first storage layer and a second layer which is a logical abstraction over the first storage layer, comprising:
a validity status table that is kept in the first storage layer of the storage system and includes validity status data indicating a validity status of each one of a plurality of first layer storage segments;
an enhanced interface unit that is implemented in the first storage layer, and is responsive to a write command that includes payload data which relates to part of an invalid segment, for providing the second layer with an unaligned write to an invalid segment indication;
a modified I/O generation module that is implemented in the second storage layer, and is responsive to receiving the unaligned write to an invalid segment indication at the second layer, for providing a modified write command for the invalid segment including initial values combined with the payload data, wherein each one of the plurality of first layer storage segments is associated with a plurality of first layer addressable storage blocks and wherein said modified I/O generation module is adapted to combine initial values with the payload data, so that the modified write command relates to the entire respective invalid segment; and
a first storage layer controller that is responsive to receiving the modified write command for writing the data from the modified write command to the entire invalid segment and updating the validity status of the segment in said validity status table to indicate that the segment is now a valid segment.

13. The system according to claim 12, wherein said modified I/O generation module is adapted to combine initial values with the payload data, so that the modified write command includes payload data for only some of the plurality of addressable storage blocks with which the respective invalid segment is associated.

14. The system according to claim 13, wherein said modified I/O generation module is adapted to combine initial values with the payload data, so that the modified write command includes the payload data and initial values for remaining blocks within the respective invalid segment.

15. The system according to claim 12, wherein a size of each one of the plurality of first layer storage segments corresponds to a minimal TRIM granularity supported by the storage system.

16. The system according to claim 12, wherein said enhanced interface unit is responsive to receiving a read command that relates to some or all blocks with which an invalid segment is associated for providing an indication that the blocks with which the invalid segment is associated are invalid, and wherein said modified I/O generation module is responsive to receiving the invalid block indication for generating a modified read response using initial values for representing initial data for each one of the blocks with which the invalid segment is associated and to which the read command relates.

17. The system according to claim 16, wherein in case the read command further relates to one or more blocks of a valid segment, said modified I/O generation module is configured to read the data from the blocks of the valid segment and concatenate the data from the valid blocks with the initial values representing data from the invalid segment.

18. The system according to claim 12, wherein the validity status data in said validity status table indicates a validity status of each one of a plurality of first layer addressable blocks, and wherein said first storage layer controller is adapted to update the validity status of each one of the blocks in the segment with which the modified write command is associated.

19. The system according to claim 18, wherein said enhanced interface unit is responsive to a read command that relates to an invalid block for providing the second layer with an indication that the block is invalid, and wherein said modified I/O generation module is responsive to receiving the invalid block indication for generating a modified read response using initial values for representing invalid data for the invalid block.

20. The system according to claim 12, wherein said first storage layer controller is responsive to a write command that includes payload data which relates to an entire invalid segment for writing the payload data to the entire invalid storage segment for updating the validity status data in the validity status table to indicate that the storage segment is now a valid storage segment.

21. The system according to claim 12, wherein said first storage layer controller is configured to write the data from the modified write command and to update the validity status of the segment in a single atomic transaction.

22. The system according to claim 12, wherein said modified I/O generation module is adapted to provide an indication in association with the modified write command not to write the initial values in the modified write command in case the indication for a respective block was modified to a valid block indication.

23. A non-transitory program storage device readable by machine, tangibly embodying a program of instructions executable by the machine to perform a method of managing I/Os in a storage system between a first storage layer and a second layer which is a logical abstraction over the first storage layer, comprising:
  maintaining within the first storage layer of the storage system validity status data indicating a validity status of each one of a plurality of first layer storage segments;
  in response to a write command that includes payload data which relates to part of an invalid segment providing the second layer with an unaligned write to an invalid segment indication; and
  in response to receiving the indication at the second layer, providing a modified write command for the invalid segment including initial values combined with the payload data, wherein each one of the plurality of first layer storage segments is associated with a plurality of first layer addressable storage blocks and wherein said providing a modified write command, comprises combining initial values with the payload data, so that the modified write command relates to the entire respective invalid segment; and
  writing the data from the modified write command to the entire invalid segment and updating the validity status of the segment to indicate that the segment is now a valid segment.

24. A method of managing I/Os in a storage system between a first storage layer and a second layer which is a logical abstraction over the first storage layer, comprising:
  maintaining within the first storage layer of the storage system validity status data indicating a validity status of each one of a plurality of first layer storage segments;
  in response to a write command that includes payload data which relates to part of an invalid segment providing the second layer with an unaligned write to an invalid segment indication;
  in response to receiving the indication at the second layer, providing a modified write command for the invalid segment including initial values combined with the payload data; wherein each one of the plurality of first layer storage segments is associated with a plurality of first layer addressable storage blocks and wherein said providing a modified write command, comprises combining initial values with the payload data, so that the modified write command relates to the entire respective invalid segment; and
  wherein a size of each one of the plurality of first layer storage segments corresponds to a minimal TRIM granularity supported by the storage system.

* * * * *